United States Patent

Senuma et al.

Patent Number: 5,126,849
Date of Patent: Jun. 30, 1992

[54] DEVICE FOR AUTOMATIC FOCUSING CONTROL FOR VIDEO CAMERA SYSTEM

[75] Inventors: Satoko Senuma; Masaaki Tsuruta, both of Tokyo, Japan

[73] Assignee: Sony Corporation, Tokyo, Japan

[21] Appl. No.: 665,245

[22] Filed: Mar. 6, 1991

[30] Foreign Application Priority Data

Mar. 9, 1990 [JP] Japan .................................. 2-59125

[51] Int. Cl.$^5$ .............................................. H04N 5/232
[52] U.S. Cl. ..................................... 358/227; 358/225; 354/402
[58] Field of Search ................... 358/227, 225, 228; 354/402, 404; 364/733

[56] References Cited

U.S. PATENT DOCUMENTS

| | | | |
|---|---|---|---|
| 4,383,274 | 5/1983 | Inuiya | 358/227 |
| 4,500,925 | 2/1985 | Hanma | 358/227 |
| 4,862,404 | 8/1989 | Schwartz | 364/733 |
| 4,974,092 | 11/1990 | Kawamura | 358/227 |
| 5,005,086 | 4/1991 | Iwamoto | 358/227 |

FOREIGN PATENT DOCUMENTS

0200675  11/1983  Japan .

Primary Examiner—Howard W. Britton
Assistant Examiner—Sherrie Hsia
Attorney, Agent, or Firm—Lewis H. Eslinger; Jay H. Maioli

[57] ABSTRACT

A video camera system has a movable focusing lens which is automatically focused to form a sharp subject image on a CCD. The CCD generates a video signal based on light transmitted from a subject through the movable focusing lens. Maximum contrast data are produced from each horizontal scanning line in an image frame in a field on the CCD, and are then integrated by an integrator. The movable focusing lens is controlled in order to maximize the integrated contrast data.

3 Claims, 9 Drawing Sheets

Scanning Direction ⟶

FIG. 1D (PRIOR ART)

Scanning Direction ⟶

DEVICE FOR AUTOMATIC FOCUSING CONTROL FOR VIDEO CAMERA SYSTEM

BACKGROUND OF THE INVENTION

1. Field of the Invention

The present invention relates to a device for automatic focusing control for a video camera system or the like.

2. Description of the Prior Art

Various automatic focusing mechanisms have been proposed for use with imaging systems such as video camera systems. One general automatic focusing mechanism is known as a TTL (Through The Lens) system in which a video signal generated by an imaging device such as a CCD (charge-coupled device) or the like is processed by a microcomputer to measure the sharpness of the image on the CCD, and a lens combined with the imaging device is moved on the basis of the measured sharpness until the image is sharply focused on the CCD.

There are two typical automatic focusing variations based on the TTL principle, depending on how optical information from the subject to be imaged is produced. The first automatic focusing scheme is of a passive nature in that information borne by light coming from the subject and entering a master lens is used directly as automatic focusing information. The second automatic focusing configuration is active in that a light signal is radiated from the video camera system to the subject and information borne by light reflected by the subject is used as automatic focusing information. The active and passive automatic focusing variations operate mostly on the triangulation principles.

Recently, however, a passive automatic focusing process which utilizes the detected contrast of an image for focusing the image has also been in wide use. The conventional passive automatic focusing process of this type will be described below with reference to FIGS. 1A through 1D and 2 of the accompanying drawings.

Figure 1A:
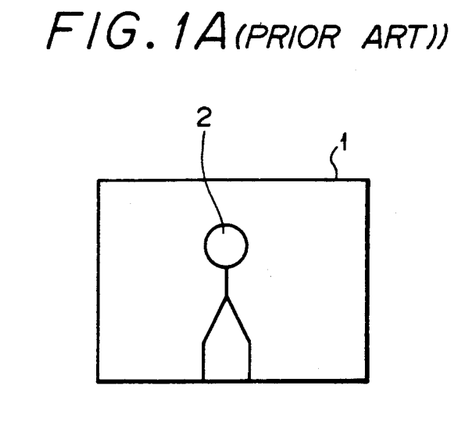
FIGS. 1A through 1D are diagrams illustrative of the principles of a conventional automatic focusing control process which utilizes the detected contrast of an image.
Figure 1B:
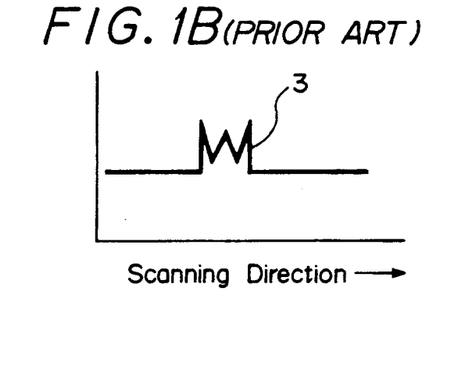
Figure 1C:
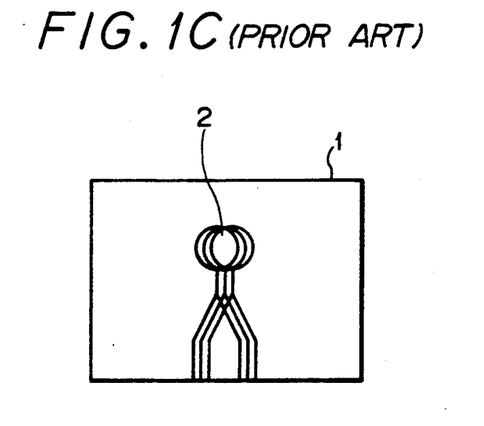
Figure 1D:
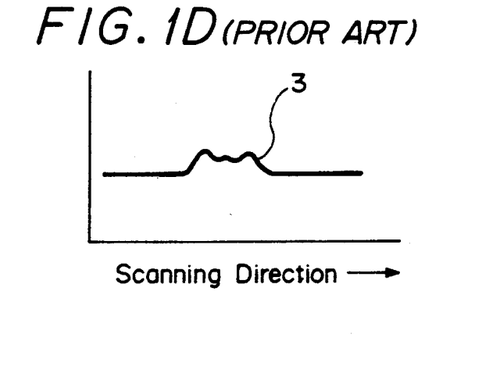
Figure 2:
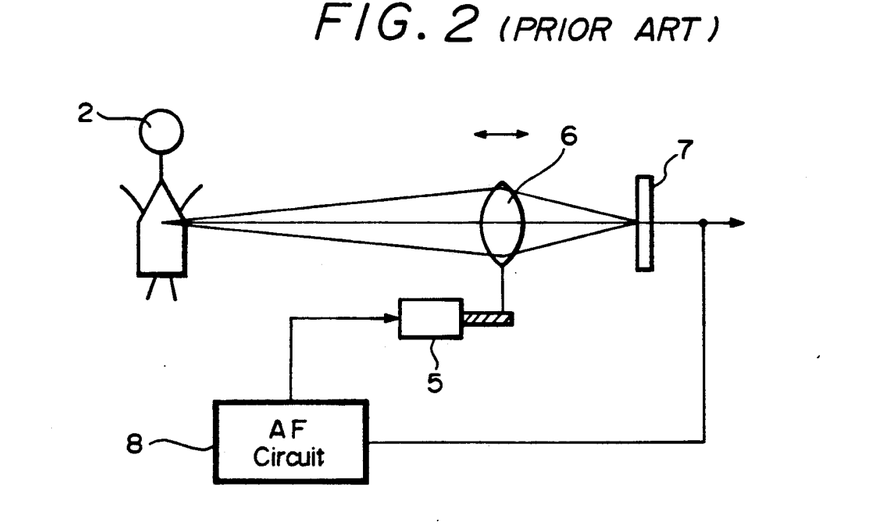
FIG. 2 is a diagram of an arrangement for carrying out the automatic focusing control process shown in FIGS. 1A through 1D.

When the image of a subject 2 formed in a viewfinder 1 of a video camera is focused and hence can clearly be seen by the user of the video camera, as shown in FIG. 1A, a video signal 3 produced by the imaging device of the video camera and passed through a filter has a high contrast and high frequency components, as shown in FIG. 1B. When the image of the subject 2 is defocused, as shown in FIG. 1C, the video signal 3 has a low contrast and low frequency components, as shown in FIG. 1D. The passive automatic focusing process is based on this principle. The video camera has a zoom lens assembly composed of a focusing lens, a zoom lens, and a master lens. For the detection of the contrast of the image, the focusing lens, indicated at 6 in FIG. 2, is moved a small distance by an automatic focusing (AF) motor 5 which is energized by an AF control circuit 8 that is supplied with a signal to reach a maximum contrast of the video signal 3 which represents the image of the subject 2 formed on a CCD 7.

Figure 3:
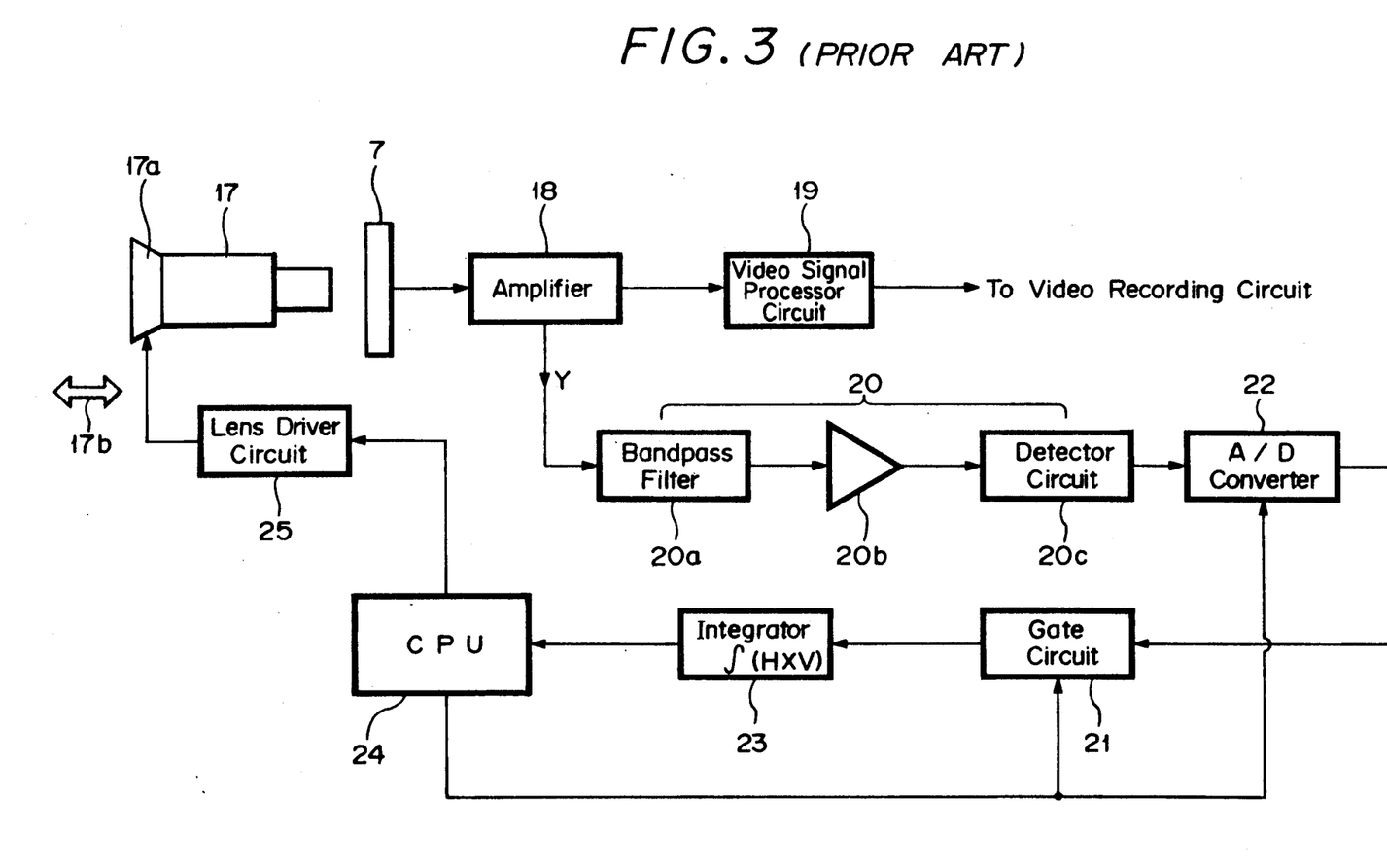
FIG. 3 is a block diagram of a conventional automatic focusing control device.

The conventional automatic focusing control device is constructed as shown in FIG. 3. As shown in FIG. 3, a video camera system or the like includes an imaging device 17 including a lens assembly composed of a focusing lens 17a, a zoom lens, and a master lens, and a CCD 7. The imaging device 17 also includes an AF motor (shown in FIG. 2) which can be driven by a drive signal from a lens driver 25 for moving the focusing lens 17a over a small distance in a direction indicated by the arrow 17b. Instead of the focusing lens 17a, the master lens may be moved as with an inner focusing lens.

Figure 4A:
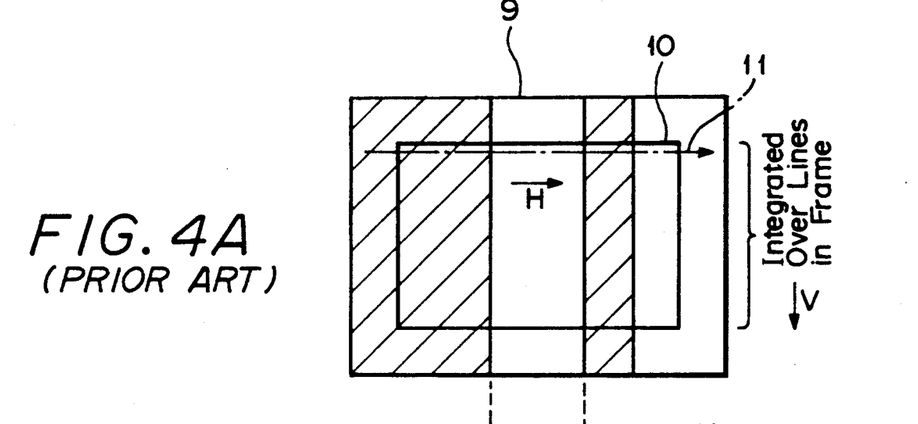
FIGS. 4A through 4E and 6A through 6F are diagrams illustrative of the waveforms of signals in the automatic focusing control device shown in FIG. 3.

As shown in FIG. 4A, the CCD 7 has a field 9 which includes an image frame 10 from which image data can be produced. Light from a subject to be imaged is transmitted through the lens assembly and applied to the CCD 7. A video signal generated by the CCD 7 is supplied through an amplifier 18 to a video signal processor 19 which in turn supplies a processed video signal to a video recording circuit. The amplifier 18 separates a luminance signal (hereinafter referred to as a "Y signal") from the video signal. The Y signal is supplied to a contrast detector 20 which detects the contrast of an image. In the contrast detector 20, a Y signal generated by the image frame 10 is passed through a bandpass filter (BPF) 20a, and then amplified by an amplifier 20b. Then, the amplified Y signal is applied to a detector 20c which detects the contrast data from the image frame 10. The contrast data from the image frame 10 are supplied to an analog-to-digital (hereinafter referred to as an "A/D") converter 22, which converts the supplied contrast data into digital contrast data. The digital contrast data are then supplied through a gate 21 to an integrator 23 which integrates the data per field. The integrated data are supplied to a CPU (central processing unit) 24. The CPU 24 controls the gate 21 and the A/D converter 22.

Figure 4B:
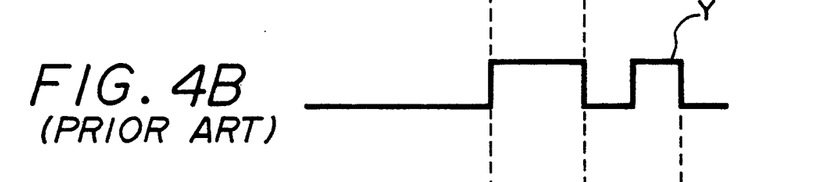
Figure 4C:
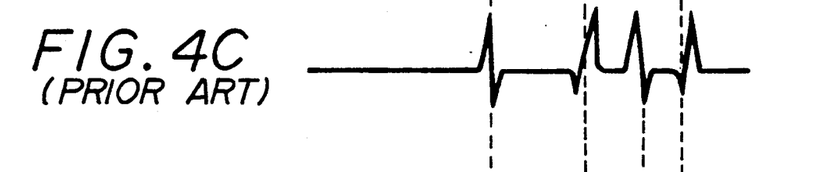
Figure 4D:
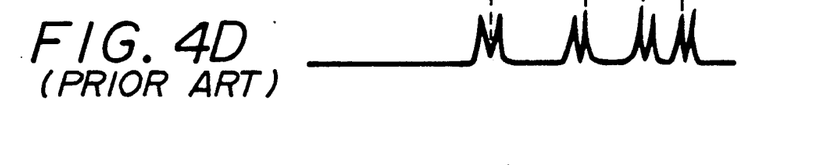
Figure 4E:
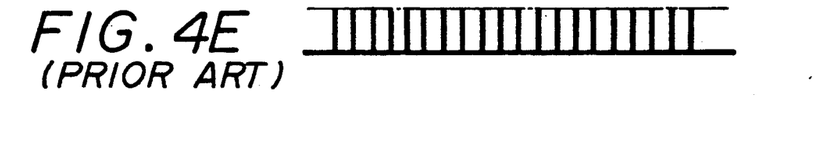

The device which is constructed as shown in FIG. 3 operates as follows: The Y signal from one horizontal scanning line 11 (FIG. 4A) within the image frame 10 in the CCD field 9 is separated as shown in FIG. 4B, and differentiated as shown in FIG. 4C. The differentiated contrast signal is then folded over as shown in FIG. 4D. The absolute contrast value is produced by the detector 20c and converted into digital data by the A/D converter 22. The digital data from the A/D converter 22 are sampled at a sampling frequency of about 4.7 MHz as shown in FIG. 4E. The contrast values at respective sampling points are added per horizontal scanning line. Then, the added contrast values per horizontal scanning line are integrated in the vertical direction in the image frame 10 by the integrator 23, thereby detecting the maximum contrast value in the image frame 10. Based on the maximum contrast value thus detected, the CPU 24 actuates the lens driver 25 to move the focusing lens 17a in directions indicated by the arrow 17b. The device shown in FIG. 3 is of the full integration type in which the contrast data are fully integrated in both the horizontal and vertical directions in the field 9.

Figure 5:
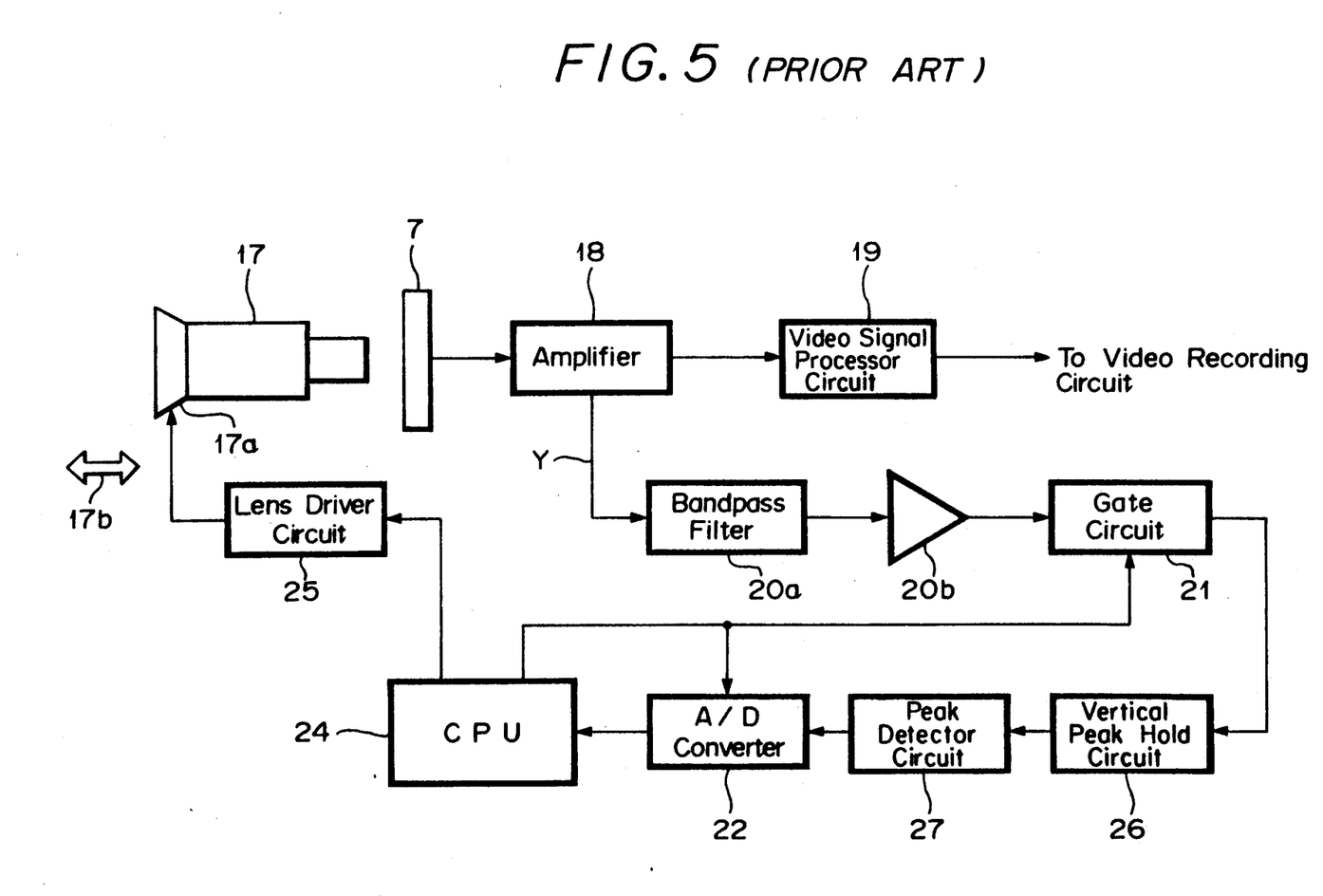
FIG. 5 is a block diagram of another conventional automatic focusing control device.

FIG. 5 of the accompanying drawings illustrates another automatic focusing control device which holds peak values in the vertical direction. The device shown in FIG. 5 differs from the device shown in FIG. 3 in that the Y signal produced by the BPF 20a and the amplifier 20b is supplied to a vertical peak hold circuit 26 through the gate 21 which is controlled by the CPU 24. The vertical peak hold circuit 26 holds peak values in the vertical direction in the image frame 10. Then, a peak detector 27 detects only the highest one of the peak contrast values on the respective lines. The detected peak contrast value is then converted by the A/D converter 22 into digital data, which are then supplied to the CPU 24.

Figure 6A:
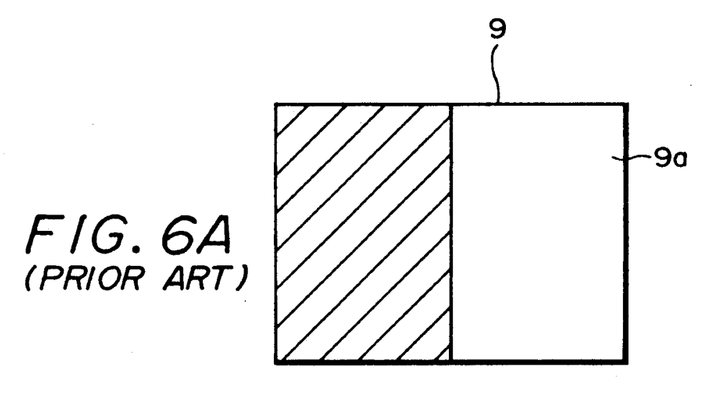
Figure 6B:
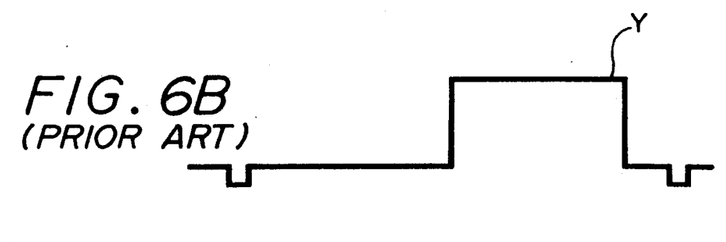
Figure 6C:
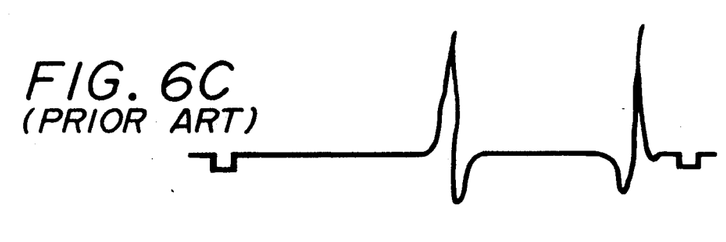
Figure 6D:
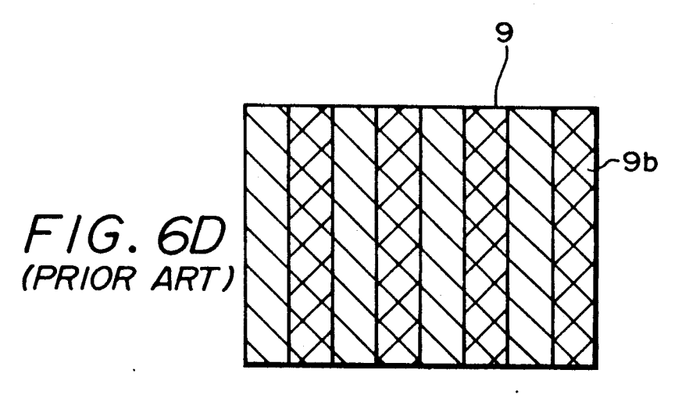
Figure 6E:
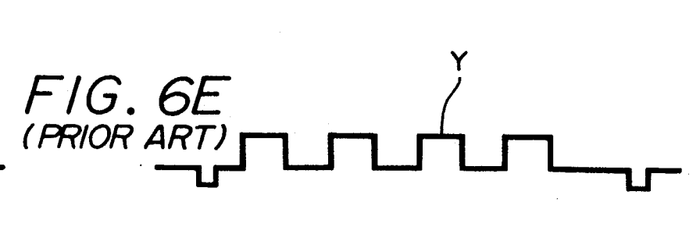
Figure 6F:
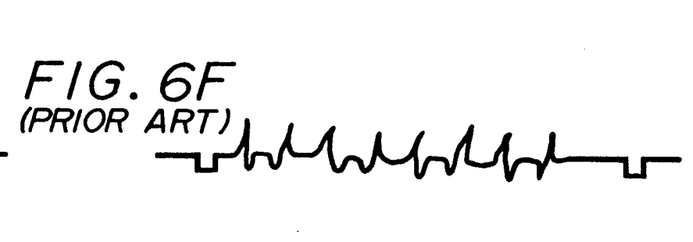

The automatic focusing control device of the full integration type shown in FIG. 3 is disadvantageous in that its dynamic range is too wide. Furthermore, as shown in FIGS. 4A through 4E, the contrast values in each horizontal line in the image frame 10 are integrated vertically in one field or frame. Therefore, contrast changes in the horizontal direction and also contrast changes in the vertical direction are integrated. Inasmuch as the contrast changes in the field during one vertical period (1V) are large, the maximum contrast value tends to vary greatly even when the video camera system wobbles slightly or the subject moves slightly. Moreover, when an image $9a$ of high contrast as viewed by the user and an image $9b$ of low contrast as viewed by the user are formed in the field 9 as shown in FIGS. 6A and 6D, respectively, Y signals are produced from these images $9a$, $9b$ as shown in FIGS. 6B and 6E, respectively. These Y signals are differentiated into contrast data as shown in FIGS. 6C and 6F, respectively. These detected contrast data are of the same average value, and hence cannot be distinguished.

Figures 7A, 7C:
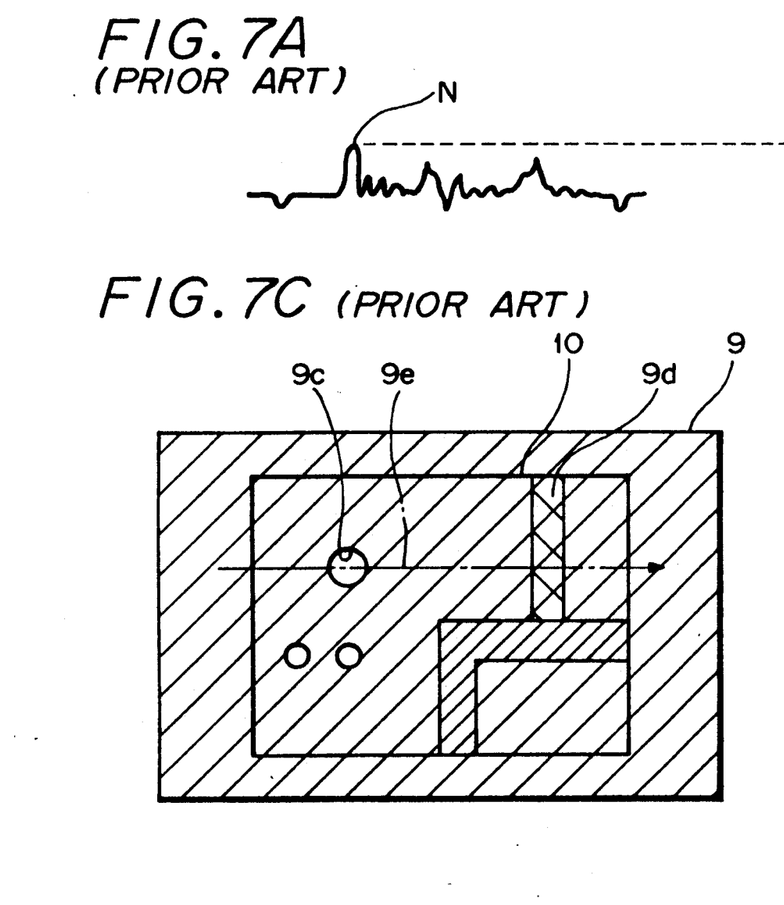
FIGS. 7A through 7D are diagrams showing the waveforms of signals in the automatic focusing control device shown in FIG. 5.
Figure 7B:
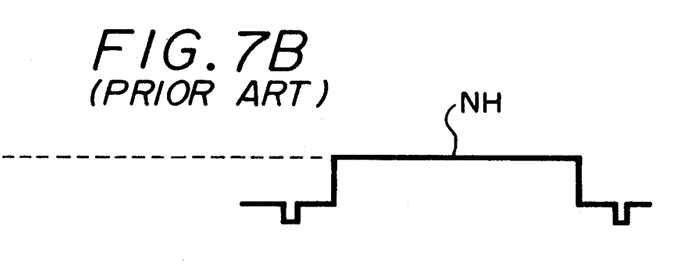
Figure 7D:
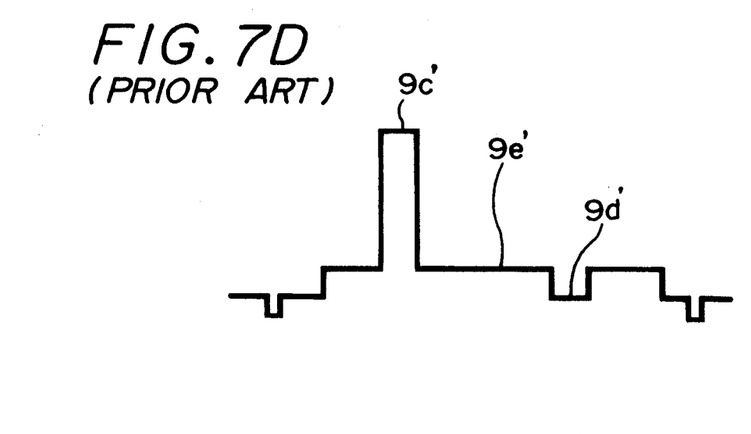

The circuit arrangement shown in FIG. 5 holds only one maximum contrast value during one vertical period. Therefore, if the contrast data contain a noise N as shown in FIG. 7A, then the noise N is held as shown in FIG. 7B. Consequently, the device shown in FIG. 5 is vulnerable to noise. In addition, in the event that the image frame 10 in the field 9 contains images of a highly bright subject $9c$, a dark area $9d$, and a relatively dark area $9e$, as shown in FIG. 7C, the maximum contrast level $9c'$ shown in FIG. 7D is held while the other lower contrast levels $9e'$, $9d'$ are being ignored. Accordingly, it is difficult to establish a gain for ordinary subjects if they contain highly bright areas or spots.

Generally, since the dynamic range of a Y signal produced by a video camera is wide, if the gain of the contrast detector is set for higher brightness, then the contrast of ordinary subjects of lower brightness cannot be properly detected, and if the gain of the peak detector is set for ordinary subjects of lower brightness, then the contrast of areas of higher brightness cannot be held at maximum level. Use of automatic gain control to avoid the above problem results in a complex contrast detector.

OBJECTS AND SUMMARY OF THE INVENTION

In view of the aforesaid shortcomings of the conventional automatic focusing control devices, it is an object of the present invention to provide a device for automatic focusing control for a video camera system or the like, the device including a sample and hold arrangement which is free from the drawbacks of the full-integration-type automatic focusing control device and also the drawbacks of the automatic focusing control device which holds one peak contrast value during one vertical period.

According to the present invention, there is provided a device for automatic focusing control, comprising a movable focusing lens, imaging means for producing a video signal based on light transmitted from a subject through the movable focusing lens, means for producing maximum contrast data from each horizontal scanning line in an image frame in a field on the imaging means based on the video signal, integrating means for integrating the maximum contrast data from each horizontal scanning line, and control means for controlling the movable focusing lens in order to maximize the integrated maximum contrast data.

The above and other objects, features, and advantages of the present invention will become apparent from the following detailed description of an illustrative embodiment thereof to be read in conjunction with the accompanying drawings, in which like reference numerals represent the same or similar objects.

DETAILED DESCRIPTION OF THE PREFERRED EMBODIMENT

Figure 8:
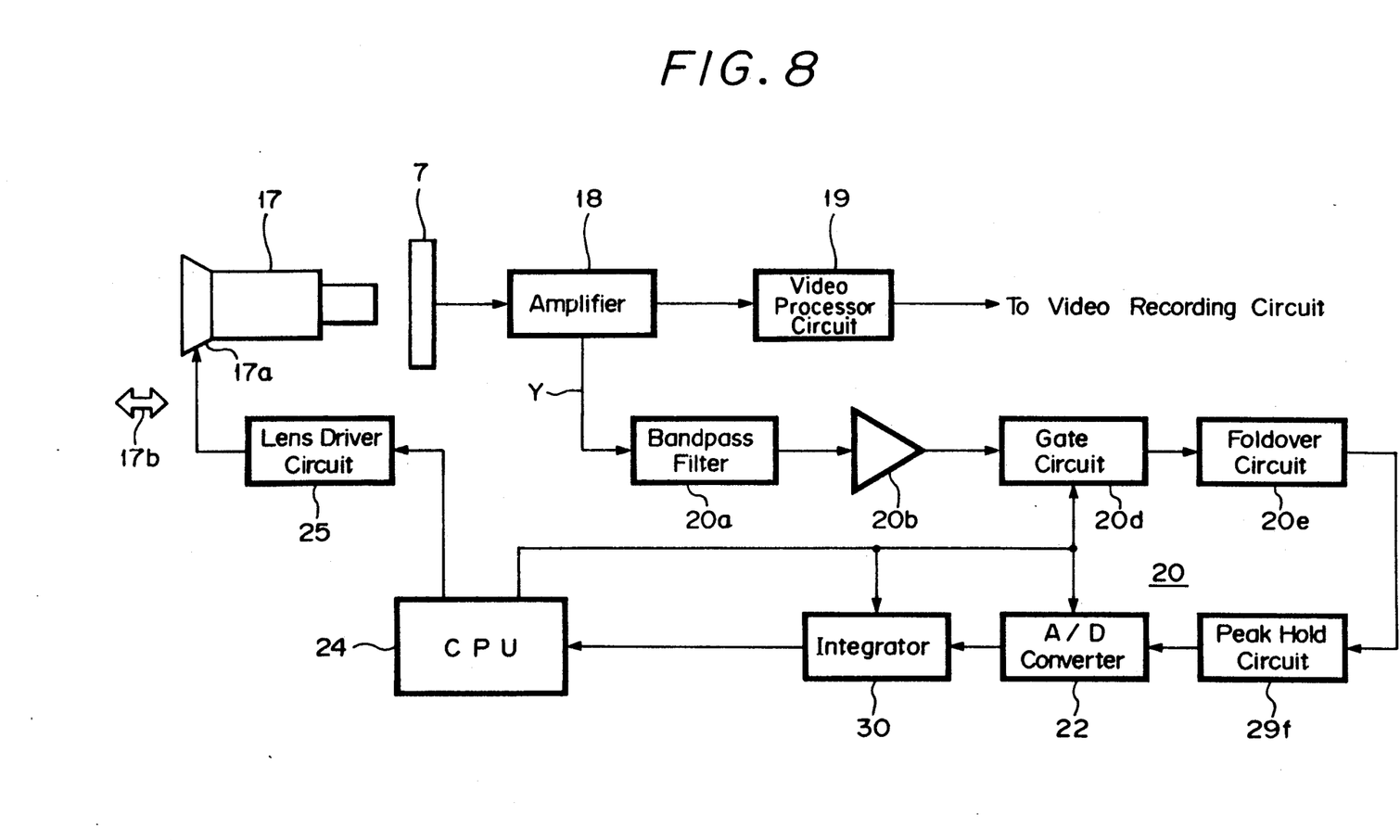
FIG. 8 is a block diagram of an automatic focusing control device according to the present invention.

FIG. 8 shows in block form a device for automatic focusing control according to the present invention.

As shown in FIG. 8, a video camera system or the like includes an imaging device 17 including a lens assembly composed of a focusing lens $17a$, a zoom lens, and a master lens, and a CCD 7. The imaging device 17 also includes an AF motor (shown in FIG. 2) which can be driven by a drive signal from a lens driver 25 for moving the focusing lens $17a$ over a small distance in the directions indicated by the arrow $17b$. Instead of the focusing lens $17a$, the master lens may be moved as with an inner focusing lens.

Figure 10A:
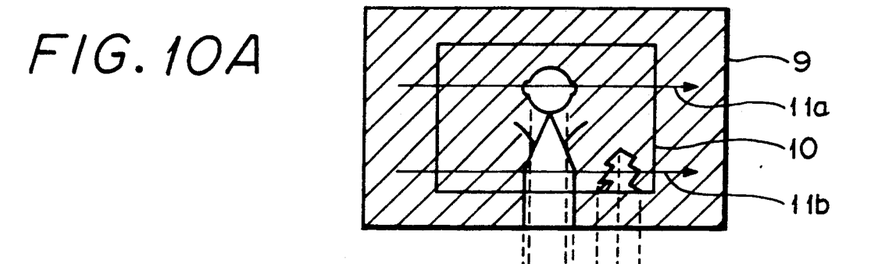
FIGS. 10A through 10I are diagrams showing the waveforms of signals in the automatic focusing control device shown in FIG. 8.
Figure 10B:
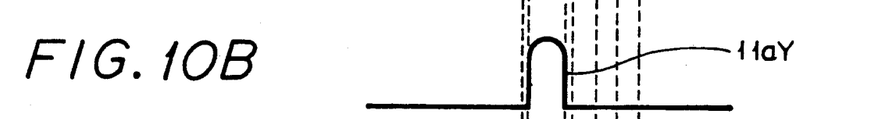
Figure 10C:
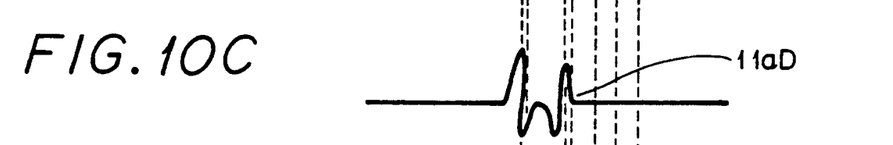
Figure 10D:
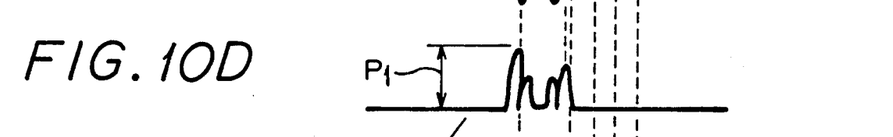
Figure 10E:
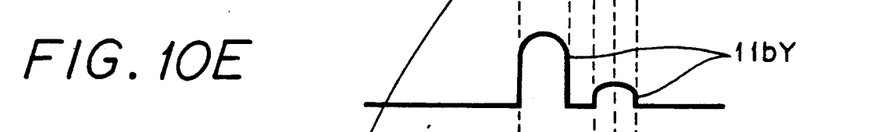
Figure 10F:
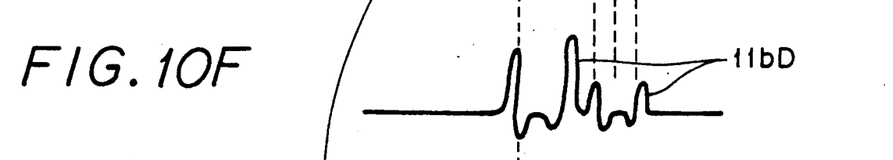
Figure 10G:
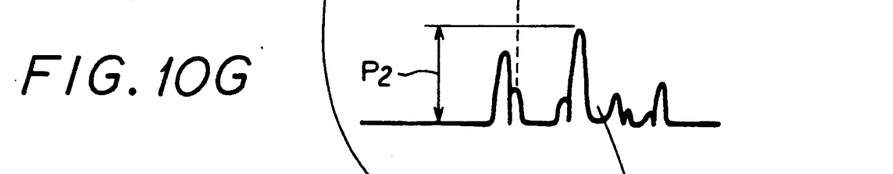

As shown in FIG. 10A, the CCD 7 has a field 9 which includes an image frame 10 from which image data can be produced. Light from a subject to be imaged is transmitted through the lens assembly and applied to the CCD 7. A video signal generated by the CCD 7 is supplied through an amplifier 18 to a video signal processor 19 which in turn supplies a processed video signal to a video recording circuit. The amplifier 18 separates a Y signal from the video signal. The Y signal is supplied to a contrast detector 20 which detects the contrast of an image. In the contrast detector 20, a Y signal generated from the image frame 10 is passed through a BPF $20a$. For example, Y signals produced along horizontal scanning lines $11a$, $11b$, respectively, in FIG. 10A are processed into signals $11aY$, $11bY$ shown in FIGS. 10B and 10E, respectively, by the BPF $20a$. The signals $11aY$, $11bY$ are then supplied to an amplifier $20b$, and the amplified signals are differentiated into respective differential signals $11aD$, $11bD$ shown in FIGS. 10C and 10F, respectively, by a differentiator (not shown). The differential signals $11aD$, $11bD$ are then passed through a gate $20d$ and a foldover circuit $20e$ by which the signals $11aD$, $11bD$ are folded over as shown in FIGS. 10D and 10G, respectively. The folded signals are then supplied to a peak hold circuit 29f, which holds the peak values of the folded signals.

Figure 10H:
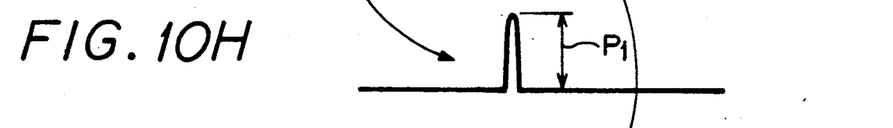
Figure 10I:
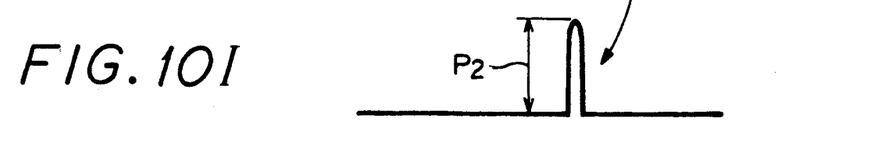

The peak values, indicated respectively by P1, P2 in FIGS. 10H and 10I, of the signals from the horizontal scanning lines 11a, 11b are then converted into digital data by an A/D converter 22. The digital data are then supplied to an integrator 30 and latched thereby. While only the signals from the horizontal scanning lines 11a, 11b have been described above, the signals from the other horizontal lines in the image frame 10 are successively processed as described above.

Figure 9:
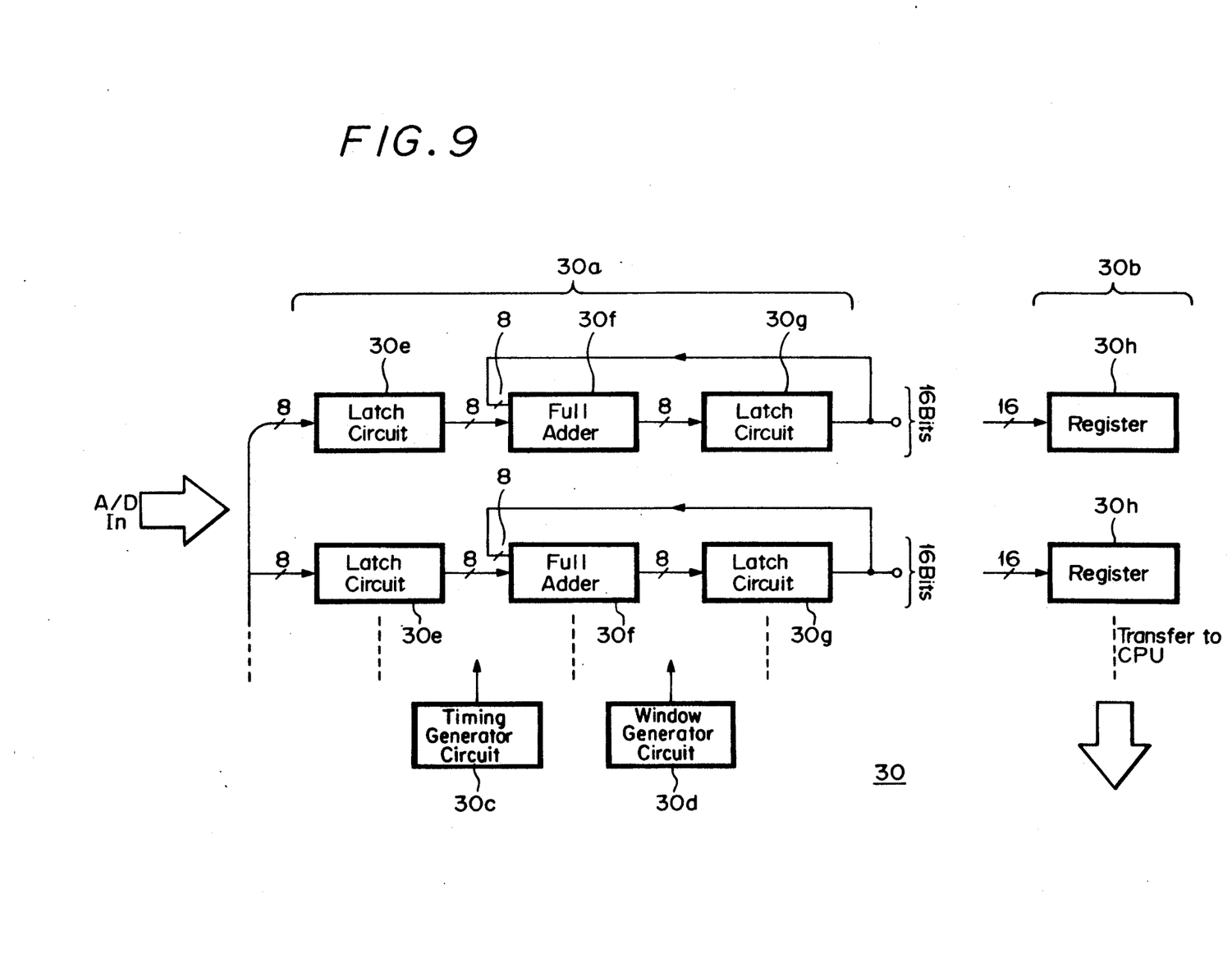
FIG. 9 is a block diagram of an integrator in the automatic focusing control device shown in FIG. 8.

The integrator 30 is shown, by way of example, in greater detail in FIG. 9. The integrator 30 comprises an integrating circuit 30a, a transfer register circuit 30b, a timing generator 30c, and a window generator 30d. The integrating circuit 30a comprises a plurality of 8-bit latches 30e, a plurality of 8-bit latches 30g, a plurality of 8-bit full adders 30f connected between the latches 30e, 30g, and a plurality of carry counters (not shown) connected to the full adders 30f, respectively. The integrating circuit 30a has an integrating capacity of about 20 bits. The transfer register circuit 30b has a plurality of transfer registers 30h. The contrast data integrated from the respective horizontal scanning lines by the integrating circuit 30a are converted into 16-bit data, which are supplied to the transfer registers 30h. The transfer registers 30h then transfer the integrated contrast data from the image frame 10 to the CPU 24. Based on the integrated data from the integrator 30, the CPU 24 detects a maximum contrast of the image on the CCD 7, and applies a control signal, which indicates whether the AF motor is to be energized or not, the direction in which the focusing lens 17a is to be rotated, and the speed at which the focusing lens 17a is to be rotated, to the lens driver 25 to move the focusing lens 17a.

The automatic focusing control device shown in FIGS. 8, 9, and 10A through 10I has a narrower dynamic range than the conventional full-integration-type automatic focusing control device. Even when the subject moves in the horizontal direction (along the horizontal scanning lines), the contrast data are stable since one peak contrast value is extracted from each horizontal scanning line. The actual contrast data produced by the automatic focusing control device according to the present invention coincide in magnitude with the contrast as viewed by the user.

Consequently, the automatic focusing control device according to the present invention is free from the drawbacks of the full-integration-type automatic focusing control device. The S/N ratio of the automatic focusing control device according to the present invention is improved as the noise is averaged compared with the conventional automatic focusing control device in which one peak contrast value is held during one vertical period, as shown in FIGS. 4A through 4E. Even when the image of a subject contains a highly bright area or spot, since contrast data other than the highly bright area are also obtained during one vertical period, the gain of the contrast detector is not required to be set for the highly bright area. Therefore, the gain can be suitably selected without any AGC system.

Although a certain preferred embodiment has been shown and described, it should be understood that many changes and modifications may be made therein without departing from the scope of the appended claims.

We claim as our invention:

1. A device for automatic focusing control, comprising:
    a movable focusing lens;
    imaging means for producing a video signal based on light transmitted from a subject through said movable focusing lens;
    means receiving the video signal for detecting maximum contrast values in each horizontal scanning line of an image frame in a field on said imaging means in the video signal;
    peak hold means receiving the maximum contrast values and holding the peak values of the maximum contrast values for each horizontal scan line of the image frame in the video signal;
    integrating means for integrating the peak values from said peak hold means for each horizontal scanning line and producing an integrated output signal therefrom; and
    control means receiving said integrated output signal for controlling said movable focusing lens to maximize the integrated output signal.

2. A device according to claim 1, wherein said integrating means comprises an integrating circuit for integrating the peak values of the maximum contrast values and a transfer register circuit receiving an output from said integrating circuit for transferring the integrated peak values to said control means.

3. A device according to claim 2, wherein said integrating circuit comprises first latch means for latching the peak values from said peak hold means, full adder means receiving an output from said first latch means, and second latch means for latching added peak values output from said full adder means.

* * * * *